United States Patent
Nishikawa et al.

(10) Patent No.: US 11,482,737 B2
(45) Date of Patent: Oct. 25, 2022

(54) METHOD FOR RECOVERING VALUABLE MATERIAL FROM LITHIUM ION SECONDARY BATTERY

(71) Applicant: DOWA ECO-SYSTEM CO., LTD., Tokyo (JP)

(72) Inventors: Chihiro Nishikawa, Tokyo (JP); Yoshihiro Honma, Tokyo (JP); Norio Nakajima, Tokyo (JP)

(73) Assignee: DOWA ECO-SYSTEM CO., LTD., Tokyo (JP)

( * ) Notice: Subject to any disclaimer, the term of this patent is extended or adjusted under 35 U.S.C. 154(b) by 422 days.

(21) Appl. No.: 16/733,525

(22) Filed: Jan. 3, 2020

(65) Prior Publication Data
US 2021/0210806 A1 Jul. 8, 2021

(51) Int. Cl.
| | | |
|---|---|---|
| H01M 10/54 | (2006.01) | |
| H01M 10/0525 | (2010.01) | |
| H01M 4/66 | (2006.01) | |
| H01M 4/587 | (2010.01) | |
| H01M 50/116 | (2021.01) | |

(Continued)

(52) U.S. Cl.
CPC ............ *H01M 10/54* (2013.01); *B02C 23/10* (2013.01); *B02C 23/20* (2013.01); *B03C 1/10* (2013.01); *B03C 1/28* (2013.01); *H01M 4/587* (2013.01); *H01M 4/661* (2013.01);
(Continued)

(58) Field of Classification Search
None
See application file for complete search history.

(56) References Cited

U.S. PATENT DOCUMENTS

| | | | | |
|---|---|---|---|---|
| 5,575,907 A | * | 11/1996 | Lindermann | H01M 10/54 423/100 |
| 2020/0078796 A1 | * | 3/2020 | Kochhar | B03B 9/06 |

FOREIGN PATENT DOCUMENTS

| | | |
|---|---|---|
| CN | 105671316 A | 6/2016 |
| EP | 1041659 A1 | 10/2000 |

(Continued)

OTHER PUBLICATIONS

"Investigation of Heating Conditions for Cobalt Recovering from Spent Lithium Ion Batteries by Magnetic Separation", Kagaku Kogaku Ronbunshu, vol. 43, Issue 4, 2017, pp. 213-218.

(Continued)

*Primary Examiner* — Carlos Barcena
(74) *Attorney, Agent, or Firm* — Greenblum & Bernstein, P.L.C.

(57) ABSTRACT

There is provided a means capable of recovering a valuable material such as cobalt and nickel, with a low grade of a metal derived from a negative electrode current collector, a low grade of fluorine, and a low grade of a material derived from a negative electrode active material. A method for recovering a valuable material from a lithium ion secondary battery, is characterized in that it includes: a heat treatment step of performing heat treatment on a lithium ion secondary battery; a crushing step of crushing a heat-treated object obtained through the heat treatment step; a classification step of classifying a crushed object obtained through the crushing step into a coarse particle product and a fine particle product; and a wet magnetic separation step of performing wet magnetic separation on the fine particle product obtained through the classification step.

17 Claims, 1 Drawing Sheet

(51) Int. Cl.
   *B03C 1/10* (2006.01)
   *B02C 23/10* (2006.01)
   *B02C 23/20* (2006.01)
   *B03C 1/28* (2006.01)
   *H01M 4/02* (2006.01)

(52) U.S. Cl.
   CPC ..... *H01M 10/0525* (2013.01); *H01M 50/116* (2021.01); *B03C 2201/20* (2013.01); *H01M 2004/027* (2013.01)

(56) References Cited

FOREIGN PATENT DOCUMENTS

| | | |
|---|---|---|
| EP | 1049190 A1 | 11/2000 |
| JP | 3443446 | 6/2003 |
| JP | 2004-011010 | 1/2004 |
| JP | 2012-79630 | 4/2012 |
| JP | 2014-199774 A | 10/2014 |
| JP | 2015-219948 A | 12/2015 |
| JP | 2016-219402 | 12/2016 |
| JP | 2017-004920 | 1/2017 |
| JP | 2017-037807 | 2/2017 |
| JP | 6268130 | 1/2018 |
| JP | 2018-078024 A | 5/2018 |

OTHER PUBLICATIONS

Japan Office Action, Japan Patent Office, Application No. 2019-186789, dated Feb. 4, 2020.

Nishikawa et al., U.S. Appl. No. 16/733,537, filed Jan. 3, 2020.

The Extended European Search Report, European Patent Office, Application No. 19213865.9, dated May 8, 2020.

Office Action, Intellectual Property Office of Singapore, issued in counterpart Singapore Patent Application No. 10201912384S, dated Oct. 14, 2021 (in English).

European Search Report, European Patent Office, Application No. 19215583.6, dated Jun. 19, 2020.

* cited by examiner

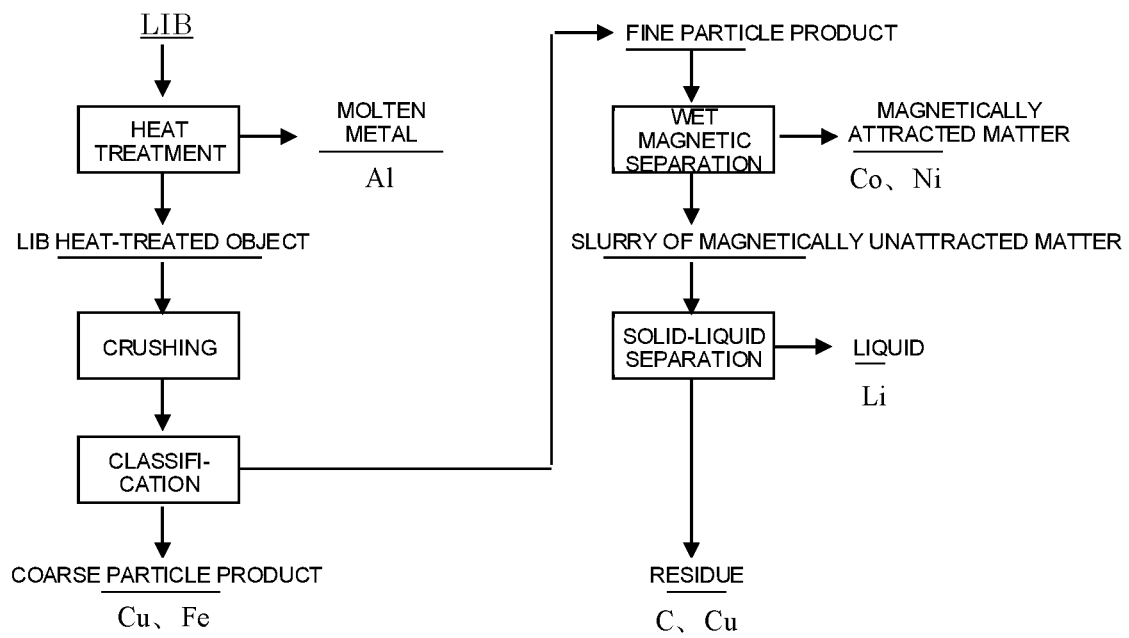

METHOD FOR RECOVERING VALUABLE MATERIAL FROM LITHIUM ION SECONDARY BATTERY

TECHNICAL FIELD

The present invention relates to a method for recovering a valuable material from a lithium ion secondary battery capable of recovering a valuable material from a positive electrode current collector, a negative electrode current collector, a positive electrode active material, and the like of a lithium ion secondary battery which is a defective product generated in a manufacturing process, and a lithium ion secondary battery which is discarded due to end of operating life of a device using the battery, end of operating life of the battery, and so on.

BACKGROUND ART

A lithium ion secondary battery is a secondary battery having a lighter weight, higher capacity, and a higher electromotive force when compared to conventional lead-acid battery, nickel-cadmium secondary battery, and so on, and is used as a secondary battery for a personal computer, an electric vehicle, a portable equipment, and so on. For example, a valuable material such as cobalt and nickel is used for a positive electrode of a lithium ion secondary battery as lithium cobaltate ($LiCoO_2$), a ternary positive electrode material ($LiNi_xCo_yMn_zO_2$ (x+y+z=1)), or the like.

Since the lithium ion secondary battery is expected to be used more in the future, recovery of a valuable material from a lithium ion secondary battery which is a defective product generated in a manufacturing process, and a lithium ion secondary battery which is discarded due to end of operating life of a device using the battery, end of operating life of the battery, and so on, is desired from a viewpoint of recycling of resources. When recovering a valuable material from a lithium ion secondary battery, it is important that various metals used in the battery are separated and recovered, in terms of increase in value of a recovered material.

As a method for recovering a valuable material from a lithium ion secondary battery, there is proposed a method for recovering cobalt and nickel from a crushed object of a heat-treated object of lithium ion battery. For example, Patent Document 1 discloses a recovery method in which a separation performance of aluminum of a positive electrode current collector, and cobalt and nickel derived from a positive electrode active material is improved by temperature regulation during heat treatment, and a separation efficiency of copper, aluminum, and iron through crushing and classification is enhanced. Further, Patent Document 2 discloses a recovery method including a melting and separating step of melting an aluminum material to separate the aluminum material, a crushing step of crushing an unmelted material, and a magnetic separation step of performing magnetic separation on a crushed object. Further, Non-Patent Document 1 discloses a technique in which crushing is performed after heating, and cobalt concentrated below a sieve is recovered after removing impurities therefrom by performing magnetic separation or flotation.

PRIOR ART DOCUMENT

Patent Document

Patent Document 1: Japanese Laid-open Patent Publication No. 2012-79630
Patent Document 2: Japanese Patent No. 6268130

Non-Patent Document

Non-Patent Document 1: Investigation of Heating Conditions for Cobalt Recovering from Spent Lithium Ion Batteries by Magnetic Separation, Kagaku Kogaku Ronbunshu, Volume 43, Issue 4, pp. 213-218, 2017

DISCLOSURE OF THE INVENTION

Problems to Be Solved by the Invention

When a lithium ion secondary battery is heat-treated, and then crushed and classified, iron and aluminum derived from an external container, and copper derived from a negative electrode current collector and the like are recovered in a coarse particle product. Further, although cobalt and nickel are concentrated in a fine particle product, a part of a metal derived from the current collector is also mixed in the fine particle product. For the purpose of recycling cobalt and nickel, it is required to separate and recover the metal derived from the current collector and a negative electrode active material from the fine particle product. However, in particular, precipitation of copper, and precipitation of cobalt and nickel from a solution are caused in a similar pH region, so that it is difficult to remove copper by precipitation through neutralization after dissolution. Further, a negative electrode active material such as carbon is a particle of several tens of nm, and when dry physical selection is employed, an adhesion force mainly caused by crosslinking of moisture between a cobalt- and nickel-containing particle and a carbon particle is generated, which makes it difficult to remove carbon. In addition, in the methods described in the aforementioned Patent Documents 1 and 2, a cobalt- and nickel-containing particle recovered by dry physical selection contains several % of fluorine, and thus a removal step of fluorine is required. It has been difficult to reduce a grade of a metal derived from a negative electrode current collector such as copper in a cobalt and nickel concentrate to less than 0.2%, reduce a grade of fluorine to less than 1%, and reduce a grade of a material derived from a negative electrode active material such as carbon to less than 5%.

The present invention has been made based on the above-described circumstances, and an object thereof is to provide a means capable of recovering a valuable material such as cobalt and nickel, with a low grade of a metal derived from a negative electrode current collector, a low grade of fluorine, and a low grade of a material derived from a negative electrode active material.

Means for Solving the Problems

To solve the above-described problems, according to the present invention, there is provided a method for recovering a valuable material from a lithium ion secondary battery, the method being characterized in that it includes: a heat treatment step of performing heat treatment on a lithium ion secondary battery; a crushing step of crushing a heat-treated object obtained through the heat treatment step; a classification step of classifying a crushed object obtained through the crushing step into a coarse particle product and a fine particle product based on a classification point of 0.45 mm or more; and a wet magnetic separation step of performing wet magnetic separation on the fine particle product obtained through the classification step. Note that the crushing step and the classification step can also be performed simultaneously. For example, the steps can also be performed as a crushing and classification step in which while crushing the heat-treated object obtained through the heat treatment step, the crushed object is classified into the coarse particle product and the fine particle product.

In this recovery method, it is also possible to use a classification point of 0.6 to 2.4 mm in the classification step. Further, it is also possible that aluminum is melted and separated in the heat treatment step to be recovered. Further, in a magnetically attracted matter obtained through the wet magnetic separation step, a content of a material derived from a negative electrode active material may be less than 5%. In that case, the material derived from the negative electrode active material may be carbon. Further, in the magnetically attracted matter obtained through the wet magnetic separation step, a grade of a metal derived from a negative electrode current collector may be less than 0.2%. In that case, one example of the metal derived from the negative electrode current collector is copper. Further, in the magnetically attracted matter obtained through the wet magnetic separation step, a grade of fluorine may be less than 1%. Further, it is also possible that the heat treatment step is performed under a low oxygen atmosphere having an oxygen concentration of 10.5 mass % or less. Further, it is also possible to provide a dry magnetic separation step of performing dry magnetic separation on the coarse particle product obtained on a sieve in the classification step. Further, it is also possible that a slurry of magnetically unattracted matter separated in the wet magnetic separation step is subjected to solid-liquid separation, and then a carbon dioxide gas is blown into the liquid.

If the dry magnetic separation is used when performing the magnetic separation on the fine particle product obtained through the classification step, aggregation of particles occurs due to adhesive moisture between particles, resulting in that metal particles derived from the negative electrode current collector and negative electrode active material fine particles contained by 10% or more in the fine particle product, and cobalt and nickel particles cannot be sufficiently separated. Further, the dry method requires an additional fluorine removal step for removing fluorine in a cobalt and nickel concentrate recovered after being subjected to the magnetic separation. The reason why the magnetic separation is performed by the wet method in the present invention is for solving these problems. In the present invention, the metal derived from the negative electrode current collector and the negative electrode active material are separated to exist in the slurry of magnetically unattracted matter, and cobalt and nickel are recovered in the magnetically attracted matter, in the wet magnetic separation step. Fluorine and lithium are dissolved during a period between slurrying of a raw material and the wet magnetic separation, and are separated to exist in the slurry of magnetically unattracted matter. By performing solid-liquid separation on the slurry of magnetically unattracted matter, the metal derived from the negative electrode current collector, and fluorine and lithium can be separated to exist in a residue and a liquid, respectively. Further, lithium hydroxide in the liquid can be recovered as lithium carbonate by blowing a carbon dioxide gas into the liquid. Although leaching treatment is required for recovering lithium, in the present invention, it is possible to simultaneously perform water leaching of lithium, leaching and removal of fluorine, and separation of the metal derived from the negative electrode current collector, and cobalt and nickel in the wet magnetic separation step, and because of that, it is possible to reduce the number of steps.

Effect of the Invention

According to the present invention, it becomes possible to, when recovering a valuable material from a lithium ion secondary battery, recover a valuable material such as cobalt and nickel with a low grade of a metal derived from a negative electrode current collector and a low grade of fluorine.

BRIEF DESCRIPTION OF THE DRAWINGS

The FIGURE is a flow chart for explaining a recovery method according to an embodiment of the present invention.

EMBODIMENTS FOR CARRYING OUT THE INVENTION

Hereinafter, one example of an embodiment for carrying out the present invention will be explained.

<Lithium Ion Secondary Battery>

A lithium ion secondary battery is a secondary battery in which a lithium ion travels between a positive electrode and a negative electrode to perform charge and discharge, and there can be cited one, for example, which includes a positive electrode, a negative electrode, a separator, an electrolytic solution containing an electrolyte and an organic solvent, and an external container being a battery case housing the positive electrode, the negative electrode, the separator, and the electrolytic solution.

A shape, a structure, a size, a material, and so on of the lithium ion secondary battery are not particularly limited, and can be appropriately selected according to purposes. As the shape of the lithium ion secondary battery, there can be cited, for example, a laminate type, a cylindrical type, a button type, a coin type, a square type, a flat type, and so on.

The positive electrode is not particularly limited as long as it has a positive electrode material on a positive electrode current collector, and can be appropriately selected according to purposes. A shape of the positive electrode is not particularly limited and can be appropriately selected according to purposes, and there can be cited a flat plate shape, a sheet shape, and the like, for example.

The positive electrode current collector is not particularly limited regarding its shape, structure, size, material, and so on, and can be appropriately selected according to purposes. As the shape of the positive electrode current collector, a foil shape and the like can be cited, for example. As the material of the positive electrode current collector, there can be cited, for example, stainless steel, nickel, aluminum, copper, titanium, tantalum, and so on. Among the above, aluminum is preferable.

The positive electrode material is not particularly limited and can be appropriately selected according to purposes, and there can be cited, for example, a positive electrode material which contains at least a positive electrode active material containing a rare valuable material, and contains a conductive agent and a binder resin according to need. Although the rare valuable material is not particularly limited and can be appropriately selected according to purposes, it is preferably at least any one of cobalt, nickel, and manganese.

As the positive electrode active material, there can be cited, for example, lithium cobaltate ($LiCoO_2$), lithium nickelate ($LiNiO_2$), lithium manganate ($LiMn_2O_4$), lithium cobalt-nickelate ($LiCo_{1/2}Ni_{1/2}O_2$), $LiNi_xCo_yMn_zO_2$, composites of the respective elements, and the like.

The conductive agent is not particularly limited and can be appropriately selected according to purposes, and there can be cited, for example, carbon black, graphite, carbon fiber, metal carbide, and the like.

The binder resin is not particularly limited and can be appropriately selected according to purposes, and there can be cited, for example, a homopolymer such as vinylidene fluoride, ethylene tetrafluoride, acrylonitrile, or ethylene oxide, or a copolymer thereof, a styrene-butadiene rubber, and the like.

The negative electrode is not particularly limited as long as it has a negative electrode material on a negative electrode current collector, and can be appropriately selected according to purposes. A shape of the negative electrode is not particularly limited and can be appropriately selected according to purposes, and there can be cited a flat plate shape, a sheet shape, and the like, for example.

As of the negative electrode current collector, a shape, a structure, a size, a material, and so on are not particularly limited and can be appropriately selected according to purposes. As the shape of the negative electrode current collector, there can be cited a foil shape and the like, for example. As the material of the negative electrode current collector, there can be cited, for example, stainless steel, nickel, aluminum, copper, titanium, tantalum, and the like. Among the above, copper is preferable.

The negative electrode material is not particularly limited and can be appropriately selected according to purposes, and there can be cited, for example, a carbon material such as graphite or hard carbon, titanate, silicon, composites of the respective elements, and the like.

Note that the positive electrode current collector and the negative electrode current collector have a structure of stack, and the stack is not particularly limited and can be appropriately selected according to purposes.

In the embodiment of the present invention, various valuable materials such as aluminum, cobalt, nickel, and copper contained in a lithium ion secondary battery are efficiently separated to be recovered through a procedure illustrated in the FIGURE. The lithium ion secondary battery to be used for the recovery is not particularly limited and can be appropriately selected according to purposes, and there can be cited, for example, a lithium ion secondary battery which is a defective product generated in a manufacturing process of the lithium ion secondary battery, a lithium ion secondary battery which is discarded due to defect of a device using the battery, end of operating life of the device using the battery, and so on, a used lithium ion secondary battery which is discarded due to end of its operating life, and so on.

<Heat Treatment Step>

As illustrated in the FIGURE, a heat treatment step (heat treatment) is first performed on a lithium ion secondary battery (LIB). A heat treatment temperature is not particularly limited as long as it is a temperature equal to or higher than a melting point of a current collector having a lower melting point out of the positive electrode current collector and the negative electrode current collector, and less than a melting point of the current collector having a higher melting point out of the positive electrode current collector and the negative electrode current collector, and can be appropriately selected according to purposes. However, the heat treatment temperature is preferably 670° C. or more, more preferably 670° C. or more and 1100° C. or less, and particularly preferably 700° C. or more and 900° C. or less. If the heat treatment temperature is less than 670° C., embrittlement of the current collector having the low melting point does not occur sufficiently in some cases, and if the heat treatment temperature exceeds 1100° C., all of the current collector having the low melting point, the current collector having the high melting point, and the external container are embrittled, resulting in that a separation efficiency of the current collectors and the external container based on crushing and classification is reduced. Further, when the external container of the lithium ion secondary battery is melted during the heat treatment, by disposing a tray for recovering the molten metal below the lithium ion secondary battery, it is possible to easily separate the metal derived from the external container and an electrode part.

By performing the heat treatment at the predetermined heat treatment temperature, in a stack in which a positive electrode current collector is aluminum and a negative electrode current collector is copper, for example, the positive electrode current collector made of aluminum foil is embrittled, and is likely to be turned into fine particles in a later-described crushing step. This embrittlement of the positive electrode current collector is caused by melting or an oxidation reaction. Further, the melted and run-down aluminum is recovered by the tray. On the other hand, the negative electrode current collector made of copper is heat-treated at a temperature which is less than a melting point of copper, so that it is not melted and can be selected at a high level in a later-described dry magnetic separation step. Further, when either the stack or the lithium ion secondary battery is housed in an oxygen-shielding container to be heat-treated, the positive electrode current collector made of aluminum foil is melted to be embrittled, and is likely to be turned into fine particles in the later-described crushing step, and on the other hand, the negative electrode current collector made of copper is heat-treated in a state where an oxygen partial pressure is low because of an oxygen-shielding effect of the oxygen-shielding container and a reducing effect provided by a negative electrode active material such as carbon contained in the stack or the lithium ion secondary battery, and thus the embrittlement of the negative electrode current collector due to oxidation does not occur. Consequently, the positive electrode current collector is finely crushed by crushing in the crushing step, and the negative electrode current collector exists in a form of coarse particles even after the crushing, and can be selected more effectively at a higher level in a later-described classification step.

Although a heat treatment time is not particularly limited and can be appropriately selected according to purposes, it is preferably 1 minute or more and 5 hours or less, more preferably 1 minute or more and 2 hours or less, and particularly preferably 1 minute or more and 1 hour or less. The heat treatment time is only required to be a heat treatment time which is taken for making a temperature of the current collector having the low melting point reach a desired temperature, and a holding time may be short. The heat treatment time within a particularly preferable range is advantageous in terms of cost required for the heat treatment.

A method of the heat treatment is not particularly limited and can be appropriately selected according to purposes, and there can be cited a method of performing the heat treatment by using a heat treatment furnace, for example. As the heat treatment furnace, there can be cited, for example, a rotary kiln, a fluidized-bed furnace, a tunnel furnace, a batch-type furnace such as a muffle furnace, a cupola furnace, a stoker furnace, and the like.

Although an atmosphere used for the heat treatment is not particularly limited and can be appropriately selected according to purposes, the heat treatment can be performed in the air. To set an atmosphere with low oxygen concentration is preferable from a point that the metal derived from the positive electrode current collector and the metal derived from the negative electrode current collector can be recovered with high grade and high recovery ratio.

As a method of realizing the aforementioned low oxygen atmosphere, it is also possible to perform the heat treatment by housing the lithium ion secondary battery or the stack in an oxygen-shielding container. A material of the oxygen-shielding container is not particularly limited as long as it is a material which is not melted at the aforementioned heat treatment temperature and can be appropriately selected according to purposes, and there can be cited iron, stainless steel, and so on, for example. In order to release a gas pressure due to combustion of electrolytic solution in the lithium ion battery or the stack, it is preferable to provide an opening to the oxygen-shielding container. An opening area of the opening is preferably set to be 12.5% or less with respect to a surface area of an external container to which the opening is provided. The opening area of the opening is more preferably 6.3% or less with respect to the surface area of the external container to which the opening is provided. If the opening area of the opening exceeds 12.5% with respect to the surface area of the external container, a large proportion of the current collector is likely to be oxidized by the heat treatment. The opening is not particularly limited regarding its shape, size, formation place, and so on, and can be appropriately selected according to purposes.

<Crushing Step>

Next, a crushing step of crushing the heat-treated object (LIB heat-treated object) obtained through the heat treatment step is performed. In the crushing step, it is preferable to crush the heat-treated object by impact, to thereby obtain a crushed object.

Further, the crushing is not particularly limited, and can be appropriately selected according to purposes. As a method of performing crushing through impact, there can be cited a method in which the heat-treated object is thrown by a rotating striking plate and dashed against a collision plate, to thereby apply an impact to the heat-treated object, and a method in which the heat-treated object is struck by a rotating beater, which can be performed by using a hammer crusher, a chain crusher, or the like, for example. Further, there can be cited a method in which the heat-treated object is struck by a ball or a rod made of ceramic, iron, or the like, and the method can be performed by using a ball mill, a rod mill, or the like. Further, the crushing can be performed by using a biaxial crusher having a short blade width and a short blade length, which performs crushing through compression.

By obtaining the crushed object through the impact, the crushing of the active material and the current collector having the low melting point is facilitated, and on the other hand, the current collector having the high melting point and whose form is not significantly changed exists in a foil state or the like. For this reason, in the crushing step, the current collector having the high melting point is subjected to cutting but nothing beyond that, and to make the current collector having the high melting point turn into fine particles is difficult to progress when compared to the current collector having the low melting point, so that it is possible to obtain the crushed object in a state where the current collector having the low melting point and the current collector having the high melting point can be efficiently separated in the later-described classification step.

Although a crushing time is not particularly limited and can be appropriately selected according to purposes, a processing time per 1 kg of the lithium ion secondary battery is preferably 1 second or more and 30 minutes or less, more preferably 2 seconds or more and 10 minutes or less, and particularly preferably 3 seconds or more and 5 minutes or less. If the crushing time is less than 1 second, the crushing is not performed in some cases, and if the crushing time exceeds 30 minutes, the crushing is sometimes performed excessively.

<Classification Step>

Next, a classification step of classifying the crushed object obtained through the crushing step into a coarse particle product and a fine particle product, is performed. A classification method is not particularly limited and can be appropriately selected according to purposes, and the method can be performed by using, for example, a vibrating sieve, a multistage vibrating sieve, a cyclone, a standard sieve according to JIS Z8801, a wet vibrating table, an air table, or the like.

A classification point used in the classification step can be appropriately selected according to purposes as long as it is 0.45 mm or more. For example, it is desirable to use the classification point of 0.6 to 2.4 mm. When the classification point exceeds 2.4 mm, mixing of the metal derived from the external container and the metal having higher melting point into the fine particle product is increased, which sometimes reduces a performance of separation between the metal, and cobalt and nickel derived from the active material. On the other hand, when the classification point is less than 0.6 mm, mixing of the metal derived from the current collector having the low melting point and the active material into the coarse particle product is increased, resulting in that a grade of the metal derived from the current collector having the high melting point in the coarse particle product is reduced, and a recovery ratio of cobalt and nickel derived from the active material in the fine particle product becomes less than 60% in some cases. Further, when a sieve is used as the classification method, by putting a disintegration promoter such as, for example, a stainless-steel ball or an alumina ball on the sieve to perform the sieving, a small crushed object adhered to a large crushed object is separated from the large crushed object, and in a manner as above, the large crushed object and the small crushed object can be separated more efficiently. This makes it possible to further improve the grade of the metal to be recovered. Note that the crushing step and the classification step can also be performed simultaneously. For example, the steps can also be performed as a crushing and classification step (crushing and classification) in which while crushing the heat-treated object obtained through the heat treatment step, the crushed object is classified into the coarse particle product and the fine particle product.

By this classification, it is possible to recover the metal derived from the external container and the current collector having the high melting point as the coarse particle product, and it is possible to recover cobalt, nickel, and lithium derived from the active material as the fine particle product. Note that the fine particle product may also be classified again. By removing a fine particle of 150 μm or less, for example, from the fine particle matter through this classification to be performed again, it is possible to reduce a content of a negative electrode active material contained in a magnetically unattracted matter in the wet magnetic separation.

<Dry Magnetic Separation Step>

Next, a dry magnetic separation step can be performed on the coarse particle product obtained through the classification step. Iron is recovered as a magnetically attracted matter, and the metal derived from the negative electrode current collector such as copper is recovered as a magnetically unattracted matter.

<Wet Magnetic Separation Step>

On the other hand, the fine particle product obtained through the classification step is subjected to a wet magnetic separation step (wet magnetic separation), and cobalt and nickel are recovered as a magnetically attracted matter. As explained above, if the dry magnetic separation is used when performing the magnetic separation on the fine particle product obtained through the classification step, aggregation of particles occurs due to adhesive moisture between particles, resulting in that metal particles derived from the negative electrode current collector and negative electrode active material fine particles contained by 10% or more in the fine particle product, and cobalt and nickel particles cannot be sufficiently separated. In the present invention, the material derived from the negative electrode active material and the metal derived from the negative electrode current collector are separated to exist in the slurry of magnetically unattracted matter, and cobalt and nickel are recovered in the magnetically attracted matter, in the wet magnetic separation step.

In the magnetically attracted matter, for example, it is possible to set carbon derived from the negative electrode active material contained in the magnetically attracted matter to less than 5%. Further, it is possible to set the metal derived from the negative electrode current collector (typically copper) contained in the magnetically attracted matter to less than 0.2%.

On the other hand, lithium is dissolved in a liquid during a period between slurrying of a raw material and the wet magnetic separation, and is separated to exist in the slurry of magnetically unattracted matter. By performing solid-liquid separation on the slurry of magnetically unattracted matter, the metal derived from the negative electrode current collector and the negative electrode active material can be separated to exist in a residue. Further, a carbon dioxide gas is blown into the liquid separated through the solid-liquid separation, which causes precipitation of lithium carbonate, and lithium is recovered. Note that it is also possible to provide, before the carbon dioxide gas is blown, a preprocessing step such as a removal step of impurities and a concentration step of the liquid for the purpose of increasing a lithium concentration. Meanwhile, fluorine or the like, for example, is recovered in the remaining liquid. Consequently, a grade of fluorine in the magnetically attracted matter can be less than 1%. Although leaching treatment is required for recovering lithium and separating fluorine from cobalt and nickel, in the present invention, it is possible to simultaneously perform water leaching of lithium, leaching and removal of fluorine, and separation of the metal derived from the negative electrode current collector, and cobalt and nickel, in the wet magnetic separation step, and because of that, it is possible to reduce the number of steps.

EXAMPLE

Hereinafter, examples of the present invention will be described. Note that the present invention is not limited to the following examples.

Example 1

As illustrated in a flow in the FIGURE, a lithium ion secondary battery of about 3.7 Kg was subjected to a heat treatment step by using a muffle furnace (FJ-41, manufactured by Yamato Scientific Co., Ltd.) as a heat treatment apparatus under a condition of a heat treatment temperature of 850° C. (1 hour for increasing temperature, 2 hours for holding) and an air supply amount of 5 L/min. Next, in a crushing step, a hammer crusher (Makino-type swing hammer crusher HC-20-3.7, manufactured by MAKINO MFG. CO., LTD.) was used as a crushing apparatus, and crushing was additionally performed one time under a condition of 50 HZ (hammer peripheral speed of 38 m/s) and a hole diameter of a punching metal at an outlet part of 10 mm.

Further, as a classification step, the crushed object obtained through the crushing step was subjected to sieving by using a sieve (having a diameter of 200 mm, manufactured by TOKYO SCREEN CO., LTD.) with an opening of a sieve mesh of 1.2 mm. A particle on the sieve of 1.2 mm (coarse particle) and a particle below the sieve (fine particle) after the sieving were respectively collected.

The obtained fine particle product was subjected to wet magnetic separation by using a drum-type magnetic separator with a magnetic force of 1500 G, a drum rotation speed of 45 rpm, a solid-liquid ratio of 10%, and a slurry supply rate of 100 ml/min, to thereby recover a magnetically attracted matter and a slurry of magnetically unattracted matter. The slurry of magnetically unattracted matter was subjected to solid-liquid separation, and after separating a solid content, a carbon dioxide gas was blown into the solution to make lithium carbonate precipitate.

On the other hand, the coarse particle product was subjected to dry magnetic separation by using a hand magnet under a condition of a magnetic force of 1500 G, and a distance of the hand magnet from the coarse particle product of 10 mm, to thereby recover a magnetically attracted matter and a magnetically unattracted matter.

The mass of the magnetically attracted matter and the magnetically unattracted matter obtained in each of the coarse particle product and the fine particle product was measured, and after that, they were heated and dissolved in aqua regia, and analysis was performed by using a high-frequency inductively coupled plasma emission spectrochemical analyzer (iCaP6300, manufactured by Thermo Fisher Scientific K.K.), to thereby determine a recovery ratio of cobalt and nickel, and a content ratio of recovered various metals. Grades of the respective products and recovery ratios of respective valuable materials in the respective products are shown in Table 1 and Table 2, respectively. Note that Table 1 shows contents (feed) of respective elements in the raw material (lithium ion secondary battery). In Table 1 and Table 2, each of (%) indicates mass %. Further, a particle on the sieve (coarse particle) was expressed by "+", and a particle below the sieve (fine particle) was expressed by "−".

Example 2

A procedure similar to that of the example 1 was employed except that the opening in the sieving in the example 1 was here set to 2.4 mm. Grades of the respective products and recovery ratios of respective valuable materials in the respective products are shown in Table 1 and Table 2, respectively.

Example 3

A procedure similar to that of the example 1 was employed except that the opening in the sieving in the example 1 was here set to 4.8 mm. Grades of the respective products and recovery ratios of respective valuable materials in the respective products are shown in Table 1 and Table 2, respectively.

Example 4

A procedure similar to that of the example 1 was employed except that the opening in the sieving in the example 1 was here set to 0.6 mm. Grades of the respective products and recovery ratios of respective valuable materials in the respective products are shown in Table 1 and Table 2, respectively.

Comparative Example 1

A procedure similar to that of the example 1 was employed except that the opening in the sieving in the example 1 was here set to 0.3 mm. Grades of the respective products (what percentage of the mass of the product is occupied by each element) and recovery ratios of respective valuable materials in the respective products (what proportion of each element is recovered in the product) are shown in Table 1 and Table 2, respectively.

Comparative Example 2

A procedure similar to that of the example 1 was employed except that the magnetic separation of fine particles in the example 1 was here set to one of dry method. Grades of the respective products and recovery ratios of respective valuable materials in the respective products are shown in Table 1 and Table 2, respectively.

TABLE 1

| | | EXAMPLE 1 | | | EXAMPLE 2 | | | EXAMPLE 3 | | | EXAMPLE 4 |
|---|---|---|---|---|---|---|---|---|---|---|---|
| | | −1.2 mm | | | −2.4 mm | | | −4.8 mm | | | |
| GRADE | +1.2 | | non- | +2.4 | | non- | +4.8 | | non- | +0.6 |
| ELEMENT | FEED (%) | mm (%) | MAG(*1) (%) | MAG(*2) (%) | mm (%) | MAG (%) | MAG (%) | mm (%) | MAG (%) | MAG (%) | mm (%) |
| Ni | 33.0 | 2.8 | 71.6 | 1.9 | 1.5 | 68.7 | 1.9 | 0.4 | 56.6 | 1.9 | 9.4 |
| Co | 5.5 | 0.0 | 12.2 | 0.3 | 0.0 | 11.7 | 0.3 | 0.0 | 9.5 | 0.3 | 1.3 |
| Li | 3.4 | 0.0 | 2.8 | 2.1 | 0.2 | 2.8 | 2.1 | 0.1 | 2.6 | 2.1 | 2.1 |
| Cu | 9.9 | 24.7 | 0.138 | 12.1 | 11.8 | 0.184 | 14.9 | 9.6 | 0.284 | 20.8 | 27.4 |
| Al | 5.6 | 5.4 | 5.1 | 6.4 | 16.8 | 5.2 | 6.4 | 21.7 | 5.3 | 7.3 | 7.7 |
| Fe | 17.0 | 64.7 | 1.3 | 1.1 | 67.5 | 1.9 | 1.4 | 66.6 | 13.4 | 2.6 | 47.4 |
| C | 20.2 | 0.8 | 1.3 | 62.7 | 0.0 | 1.3 | 59.1 | 0.0 | 1.3 | 57.8 | 1.7 |
| F | 1.5 | 0.7 | 0.015 | 0.0 | 0.8 | 0.017 | 0.0 | 1.1 | 0.021 | 0.0 | 1.0 |

| | EXAMPLE 4 | | COMPARATIVE EXAMPLE 1 | | | COMPARATIVE EXAMPLE 2 | | |
|---|---|---|---|---|---|---|---|---|
| | −0.6 mm | | | −0.3 mm | | | −1.2 mm | |
| GRADE ELEMENT | MAG (%) | non-MAG (%) | +0.3 mm (%) | MAG (%) | non-MAG (%) | +1.2 mm (%) | MAG (%) | non-MAG (%) |
| Ni | 67.9 | 1.4 | 31.1 | 68.9 | 1.1 | 2.8 | 46.0 | 0.9 |
| Co | 12.9 | 0.3 | 5.2 | 12.7 | 0.3 | 0.0 | 8.3 | 0.2 |
| Li | 2.9 | 2.3 | 2.9 | 0.8 | 0.9 | 0.0 | 4.4 | 4.1 |
| Cu | 0.025 | 1.8 | 14.6 | 0.060 | 0.8 | 24.7 | 0.3 | 7.5 |
| Al | 5.0 | 5.0 | 6.0 | 3.1 | 5.8 | 5.4 | 4.3 | 6.7 |
| Fe | 1.7 | 1.1 | 27.1 | 1.3 | 2.3 | 64.7 | 4.2 | 0.9 |
| C | 1.9 | 73.7 | 4.4 | 1.3 | 74.0 | 0.8 | 14.6 | 57.8 |
| F | 0.021 | 0.0 | 2.0 | 0.014 | 0.0 | 0.7 | 1.6 | 2.0 |

(*1)MAG: MAGNETICALLY ATTRACTED MATTER
(*2)non-MAG: MAGNETICALLY UNATTRACTED MATTER

TABLE 2

| | | EXAMPLE 1 | | | | EXAMPLE 2 | | | | EXAMPLE 3 | | | EXAMPLE 4 |
|---|---|---|---|---|---|---|---|---|---|---|---|---|---|
| | | −1.2 mm | | | | −2.4 mm | | | | −4.8 mm | | | |
| RECOVERY RATIO ELEMENT | +1.2 mm (%) | MAG(*1) (%) | non-MAG(*2) (%) | LIQ-UID (%) | +2.4 mm (%) | MAG (%) | non-MAG (%) | LIQ-UID (%) | +4.8 mm (%) | MAG (%) | non-MAG (%) | LIQ-UID (%) | +0.6 mm (%) |
| Ni | 2.1 | 96.1 | 1.7 | 0.0 | 2.0 | 96.0 | 2.0 | 0.0 | 0.4 | 97.7 | 1.9 | 0.0 | 12.8 |
| Co | 0.0 | 98.3 | 1.7 | 0.0 | 0.0 | 98.1 | 1.9 | 0.0 | 0.0 | 98.0 | 2.0 | 0.0 | 9.7 |
| Li | 0.0 | 36.4 | 19.6 | 44.0 | 0.0 | 37.4 | 20.5 | 42.1 | 0.0 | 38.2 | 20.8 | 41.0 | 20.3 |
| Cu | 61.7 | 0.6 | 37.7 | 0.0 | 42.9 | 1.0 | 56.1 | 0.0 | 24.0 | 1.5 | 74.5 | 0.0 | 94.8 |
| Al | 23.8 | 40.7 | 35.5 | 0.0 | 23.0 | 40.9 | 36.1 | 0.0 | 20.4 | 42.4 | 37.2 | 0.0 | 46.8 |
| Fe | 94.6 | 3.5 | 1.9 | 0.0 | 92.4 | 5.6 | 2.0 | 0.0 | 62.7 | 34.9 | 2.4 | 0.0 | 95.0 |
| C | 1.0 | 2.9 | 96.2 | 0.0 | 0.0 | 2.7 | 97.3 | 0.0 | 0.0 | 3.2 | 96.8 | 0.0 | 1.1 |
| F | 12.5 | 0.5 | 0.3 | 86.7 | 12.2 | 0.5 | 0.3 | 87.0 | 11.5 | 0.5 | 0.3 | 87.6 | 24.4 |

| | EXAMPLE 4 | | | COMPARATIVE EXAMPLE 1 | | | | COMPARATIVE EXAMPLE 2 | | |
|---|---|---|---|---|---|---|---|---|---|---|
| | −0.6 mm | | | | −0.3 mm | | | | −1.2 mm | |
| RECOVERY RATIO ELEMENT | MAG (%) | non-MAG (%) | LIQ-UID (%) | +0.3 mm (%) | MAG (%) | non-MAG (%) | LIQ-UID (%) | +1.2 mm (%) | MAG (%) | non-MAG (%) |
| Ni | 85.7 | 1.5 | 0.0 | 53.1 | 46.7 | 0.2 | 0.0 | 2.1 | 97.2 | 0.7 |
| Co | 88.8 | 1.5 | 0.0 | 48.2 | 51.6 | 0.3 | 0.0 | 0.0 | 99.3 | 0.7 |
| Li | 26.2 | 18.6 | 34.9 | 64.8 | 5.0 | 4.6 | 25.5 | 0.0 | 75.0 | 25.0 |
| Cu | 0.1 | 5.1 | 0.0 | 98.2 | 0.1 | 1.7 | 0.0 | 61.7 | 4.3 | 34.0 |
| Al | 28.4 | 24.8 | 0.0 | 78.2 | 12.2 | 9.6 | 0.0 | 23.8 | 49.0 | 27.2 |
| Fe | 3.3 | 1.8 | 0.0 | 97.4 | 1.8 | 0.9 | 0.0 | 94.6 | 5.0 | 0.4 |
| C | 2.8 | 96.1 | 0.0 | 1.5 | 1.5 | 97.0 | 0.0 | 1.0 | 41.3 | 57.7 |
| F | 0.4 | 0.3 | 74.9 | 80.9 | 0.2 | 0.2 | 18.7 | 12.5 | 60.7 | 26.7 |

(*1)MAG: MAGNETICALLY ATTRACTED MATTER
(*2)non-MAG: MAGNETICALLY UNATTRACTED MATTER In the example 1, it was possible to recover 90% or more of cobalt and nickel as the magnetically attracted matter, as shown in Table 2. Further, as shown in Table 1, regarding the grades of cobalt and nickel, the grades of cobalt and nickel were 80% or more in total, the grade of copper being the metal derived from the negative electrode current collector was less than 0.2%, the grade of fluorine was less than 1%, and the grade of carbon being the element derived from the negative electrode active material was less than 5%, and in a manner as above, it was possible to recover high-quality cobalt and nickel.

In the example 2, it was possible to recover 90% or more of high-quality cobalt and nickel in which the grades of cobalt and nickel were 80% or more in total, the grade of copper was less than 0.2%, the grade of fluorine was less than 1%, and the grade of carbon was less than 5%, similarly to the example 1.

In the example 3, it was possible to recover 90% or more of high-quality cobalt and nickel in which the grade of carbon was less than 5%, similarly to the example 1. However, iron was mixed in the fine particle product by 37%, and in the magnetic separation of fine particle product, 35% of iron was recovered in the magnetically attracted matter (=Co/Ni concentrate). As a result of this, the grade of iron in the magnetically attracted matter became about 13%, as shown in Table 1.

In the example 4, it was possible to recover 85% or more of high-quality cobalt and nickel in which the grades of cobalt and nickel were 80% or more in total, the grade of copper was less than 0.2%, the grade of fluorine was less than 1%, and the grade of carbon was less than 5%.

In the comparative example 1, as shown in Table 2, 48% of cobalt and 53% of nickel were recovered in the coarse particle matter, and could not be recovered by being separated from the other constituents.

In the comparative example 2, as shown in Table 2, 41% of carbon was recovered in the magnetically attracted matter, and as a result of this, the grade of carbon in the magnetically attracted matter became about 15%, as shown in Table 1. Further, the grade of fluorine became 1% or more.

What is claimed is:

1. A method for recovering a valuable material from a lithium ion secondary battery, the method comprising:
    performing heat treatment on the lithium ion secondary battery, and the heat treatment on the lithium ion secondary battery is performed at 670° C. or more and 1100° C. or less;
    crushing a heat-treated object obtained through the performing the heat treatment;
    classifying a crushed object obtained through the crushing into a coarse particle product and a fine particle product based on a classification point of 0.45 mm or more; and
    performing wet magnetic separation on the fine particle product obtained through the classifying.

2. The method for recovering a valuable material from a lithium ion secondary battery according to claim 1, wherein a classification point of 0.6 mm or more and 2.4 mm or less is used in the classifying.

3. The method for recovering a valuable material from a lithium ion secondary battery according to claim 1, wherein aluminum is melted and separated in the performing the heat treatment to be recovered.

4. The method for recovering a valuable material from a lithium ion secondary battery according to claim 1, wherein in a magnetically attracted matter obtained through the performing the wet magnetic separation, a content of a material derived from a negative electrode active material is less than 5%.

5. The method for recovering a valuable material from a lithium ion secondary battery according to claim 4, wherein the material derived from the negative electrode active material is carbon.

6. The method for recovering a valuable material from a lithium ion secondary battery according to claim 1, wherein in the magnetically attracted matter obtained through the performing the wet magnetic separation, a grade of a metal derived from a negative electrode current collector is less than 0.2%.

7. The method for recovering a valuable material from a lithium ion secondary battery according to claim 6, wherein the metal derived from the negative electrode current collector is copper.

8. The method for recovering a valuable material from a lithium ion secondary battery according to claim 1, wherein in the magnetically attracted matter obtained through the performing the wet magnetic separation, a grade of fluorine is less than 1%.

9. The method for recovering a valuable material from a lithium ion secondary battery according to claim 1, wherein the performing the heat treatment is performed under a low oxygen atmosphere having an oxygen concentration of 10.5 mass % or less.

10. The method for recovering a valuable material from a lithium ion secondary battery according to claim 1, further comprising
    performing dry magnetic separation on the coarse particle product obtained on a sieve in the classifying.

11. The method for recovering a valuable material from a lithium ion secondary battery according to claim 1, wherein a slurry of magnetically unattracted matter separated in the performing the wet magnetic separation is subjected to solid-liquid separation, and then a carbon dioxide gas is blown into the liquid.

12. The method for recovering a valuable material from a lithium ion secondary battery according to claim 1, wherein a slurry of magnetically unattracted matter separated in the performing the wet magnetic separation is subjected to solid-liquid separation, and a removal of lithium and fluorine is performed on a liquid obtained through the solid-liquid separation.

13. The method for recovering a valuable material from a lithium ion secondary battery according to claim 12, wherein the removal of lithium and fluorine includes simultaneously performing water leaching of lithium, and leaching and removal of fluorine.

14. The method for recovering a valuable material from a lithium ion secondary battery according to claim 12, wherein a metal derived from a negative electrode current collector and a negative electrode active material are separated from a residue obtained through the solid-liquid separation.

15. The method for recovering a valuable material from a lithium ion secondary battery according to claim 14, wherein the metal derived from a negative electrode current collector is copper, and the negative electrode active material is carbon.

16. The method for recovering a valuable material from a lithium ion secondary battery according to claim 1, wherein the performing wet magnetic separation includes performing wet magnetic separation on the fine particle product obtained directly through the classifying.

17. A method for recovering a valuable material from a lithium ion secondary battery, the method comprising:
performing heat treatment on the lithium ion secondary battery;
crushing a heat-treated object obtained through the performing the heat treatment;
classifying a crushed object obtained through the crushing into a coarse particle product and a fine particle product based on a classification point of 0.45 mm or more; and
performing wet magnetic separation on the fine particle product obtained through the classifying, wherein
aluminum is melted and separated in the performing the heat treatment to be recovered.

* * * * *